Dec. 12, 1961     J. W. MEULENDYK ET AL     3,012,541

TIMED DELAY ACTUATOR

Filed April 2, 1959

INVENTORS.
CHARLES H. NICHOLS, JR.
BY JOHN W. MEULENDYK

ATTORNEY

United States Patent Office 3,012,541
Patented Dec. 12, 1961

3,012,541
TIMED DELAY ACTUATOR
John W. Meulendyk and Charles H. Nichols, Jr., Kalamazoo, Mich., assignors, by mesne assignments, to Pneumo Dynamics Corporation, Cleveland, Ohio, a corporation of Delaware
Filed Apr. 2, 1959, Ser. No. 803,773
6 Claims. (Cl. 121—38)

This invention relates to hydraulic actuators and more particularly to an actuator incorporating a timed delay operational feature.

It is an important object of this invention to provide an actuator operable in response to a signal supplied from an external source after a predetermined timed delay.

It is another object of this invention to provide an actuator incorporating a valve which is operated by a hydraulic timed delay mechanism.

It is still another object of this invention to provide a hydraulic delay valve operator for use in conjunction with actuators.

It is still another object of this invention to provide a piston and cylinder type actuator which is operated by means of a timed delay valve operated by an external signal.

Further objects and advantages will appear from the following description and drawings, wherein.

Figure 1:
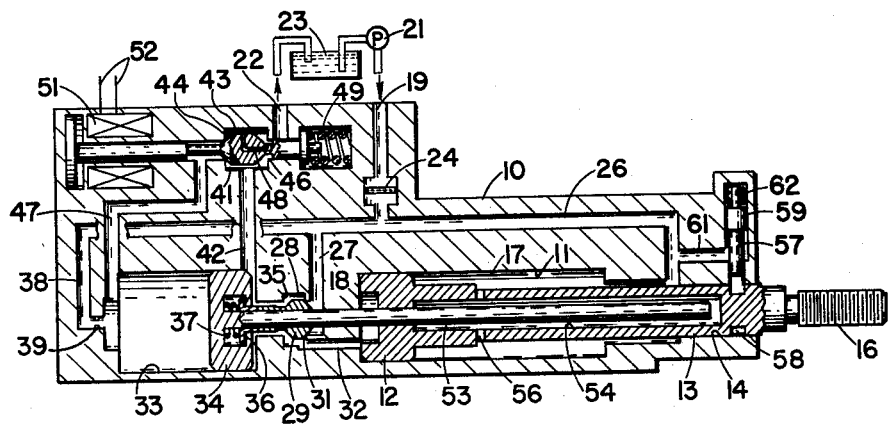
FIGURE 1 is a schematic illustration of an actuator incorporating this invention illustrating the positions the elements assume prior to the application of an electrical signal thereto.

The preferred actuator according to this invention includes a body 10 formed with a cylinder bore 11 along which a piston head 12 slides under the influence of fluid under pressure. The piston head 12 is integrally formed with a piston rod 13 which extends with sealing engagement through an outer bore 14. The outer end of the piston rod 13 is formed with a threaded shank 16 so that an operated load can be connected. The body 10 cooperates with the piston head 12 to form a first chamber 17 on the right side of the piston head 12 and a second chamber 18 on the left side of the piston head 12.

An inlet port 19 is adapted to be connected to a source of pressure fluid such as a pump 21 and an outlet port 22 is adapted to be connected to the hydraulic system reservoir 23. The inlet port 19 is connected through a filter 24 and a passage 26 to the first chamber 17 so that the first chamber is pressurized whenever pressure is supplied by the pump 21. If the actuator is supplied from a pressure system which is used to operate other devices, a valve would normally be provided between the pump 21 and the inlet port 19; however, since it forms no part of this invention, it has not been shown.

A second passage 27 connects the passage 26 to a valve chamber 28 formed in the body 10. A valve poppet 29 is positioned in the valve chamber 28 and is movable from a closed position shown in FIGURES 1 and 3 to an open position shown in FIGURE 2. When the valve poppet 29 is in the closed position, it engages a valve seat 31 and isolates the second passage 27 from the valve chamber 28. The valve chamber 28 is in turn connected to the second chamber 18 through a passage 32 so fluid under pressure from the inlet port 19 is supplied to the second chamber 18 when the valve poppet 29 moves to the open position of FIGURE 2 but is isolated therefrom when the valve poppet is in the closed position.

The body 10 is formed with a bore 33 connected to the valve chamber 28 through a valve seat 35. A plunger 34 is movable in the bore 33 from a right-hand position shown in FIGURES 1 and 3 at which time it is adjacent to the valve poppet 29 and a left-hand position shown in FIGURE 2 in which it is spaced from the valve poppet 29. A spring loaded operator 36 mounted in the plunger 34 is resiliently urged to the right in a direction toward the valve poppet 29 by a spring 37. When the plunger 34 moves to the right-hand position, the operator 36 engages the valve poppet 29 and moves it into engagement with the valve seat 31 thereby closing the valve. The bore 33 to the left side of the plunger 34 is connected to the inlet port 19 through the passage 26, a passage 38, and an orifice 39. Therefore, the left side of the plunger 34 is in permanent communication with the source of fluid under pressure through the orifice 39. The bore 33 on the right side of the plunger 34 is in communication with a pilot valve chamber 41 through a passage 42. A pilot valve poppet 43 is positioned within the pilot valve chamber 41 and is movable from a normal left-hand position where it engages a valve seat 44 to a right-hand position where it engages a valve seat 46.

The pilot valve chamber 41 is connected to the outlet port 22 through the valve seat 46 so the outlet port 22 is in communication with the right side of the plunger 34 when the pilot valve poppet 43 is in the left-hand position. When the pilot valve poppet 43 moves to the right-hand position in engagement with the valve seat 46, the pilot valve chamber 41 is in communication with the left side of the plunger 34 through a passage 47. Therefore, when the pilot valve poppet 43 is in the right-hand position, both sides of the plunger 34 are connected together and are maintained at equal pressure. The pilot valve poppet 43 is formed with a restricted flow path or orifice 48 which provides a restricted flow connection between the pilot valve chamber 41 and the outlet port 22 when the pilot valve poppet 43 engages the valve seat 46. A spring 49 engages the pilot valve poppet 43 and urges it toward the left-hand position and an electrically operated solenoid 51 is operable by an electrical signal supplied through the electrical connections 52 to overcome the action of the spring 49 and move the pilot valve poppet 43 to the right-hand position.

Figure 2:
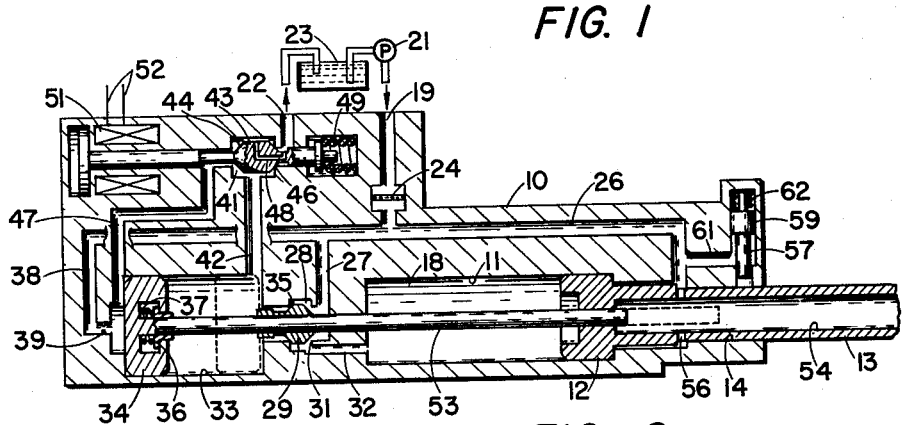
FIGURE 2 is a view similar to FIGURE 1 illustrating the position the elements assume when an electrical signal is supplied to the actuator.

In order to move the valve operating plunger 34 to the left-hand position of FIGURE 2 when the pilot valve is moved to the right-hand position, the plunger is provided with a rod extension 53 which extends through the valve poppet 29 and the piston head 12 into an axial bore 54 formed in the piston rod 13. The piston rod 13 is provided with radial ports 56 which provide communication between the bore 54 and the first chamber 17 so that the bore 54 is always subjected to inlet pressure. The right end of the rod extension 53 is therefore exposed to supply pressure and produce a force reaction on the plunger 34 urging it to the left the magnitude of which is a function of the cross sectional area of the rod extension 53 times the supply pressure.

When the two sides of the plunger 34 are connected together through the pilot valve poppet 43 as shown in FIGURE 2, the pressure on the two sides of the poppet is less than supply pressure due to the pressure drop through the orifice 39. However, since the rod extension 53 is exposed to full supply pressure, a net fluid reaction force is developed urging the plunger 34 to the left-hand position of FIGURE 2. When the valve operating plunger 34 is in the right-hand position of FIGURES 1 and 3, the valve chamber 28 is in communication with the right side of the plunger 34 through the valve seat 35 and the second chamber 18 is in communication with the outlet port 22. When the plunger 34 is spaced from its right-hand position, as shown in FIGURE 2, the valve poppet 29 moves in response to the pressure in the passage 27 into engagement with the valve seat 35. This movement of the valve poppet 29 isolates the chamber 18 from the outlet port 22 and connects it to the inlet port 19.

In order to insure that the piston head 12 and the piston rod 13 will be maintained in the left-hand extreme position of FIGURE 1 whenever pressure is not supplied to the system, a latch 57 is mounted for radial movement in the body 10. The forward end of the latch 57 is adapted to extend into an annular groove 58 when the piston rod 13 is in the left-hand extreme position and is locked in this position by a spring 62 unless fluid under pressure is supplied to the inlet port 19. When fluid under pressure is supplied to the inlet port 19, it is transmitted to the underside of a head 59 on the latch 57 through the passage 26 and a passage 61 and operates to overcome the action of the spring 62 to move the latch 57 out of the annular groove 58.

In operation, the various elements normally are maintained in the position shown in FIGURE 1 when fluid under pressure is supplied to the inlet port 19 by the pump 21 and an electrical signal is not supplied to the solenoid 51. At this time, the first chamber 17 is maintained at inlet pressure and the second chamber 18 is maintained at reservoir return pressure. Therefore, a hydraulic force is developed on the piston head 12 holding it in the left-hand extreme position. Also, the left side of the plunger 34 is exposed to inlet pressure since there is no flow through the orifice 39 to cause a pressure drop and a net force is developed on the plunger 34 urging it to the right to maintain the valve poppet 29 in its right-hand position. It should be noted that the latch 57 is in the release position due to these pressures supplied from the pump 21.

When the solenoid is operated by an electrical signal supplied through the electrical connection 52, the pilot valve poppet 43 shifts to the right and provides a connection between the two sides of the valve operating plunger 34. This balances the pressure on the two sides of the plunger at a pressure less than supply pressure due to the pressure drop through the orifice so that the force developed on the rod extension 53 operates to move the valve operating plunger 34 to the left position shown in FIGURE 2. As soon as the valve operating plunger 34 begins to move to the left from its right-hand extreme position, the valve poppet 29 is shifted to the left by the pressure on the right side of the valve seat 31 to the position of FIGURE 2. This results in a connection between the inlet port 19 and the second chamber 18. The second chamber 18 is formed with a larger effective area than the first chamber 17 so that a net force is developed urging the piston head 12 to the right.

The effective area of the second chamber 18 is equal to the cross sectional area of the bore 11 minus the cross sectional area of the rod extension 53 while the effective area of the first chamber 17 is equal to the cross section of the bore 11 minus the cross sectional area of the piston rod 13 minus the area of the rod extension 53. Since the piston rod 13 is relatively large in area, the effective area of the chamber 17 is less than the effective area of the chamber 18 by an appreciable amount and a net force is developed urging the piston head 12 and piston rod 13 to the right when both chambers are supplied with supply pressure. Since the valve operating plunger 34 starts to move to the left and permits the valve poppet 29 to shift as soon as the pilot valve poppet 43 is operated, the piston rod 13 begins to extend as soon as an electrical signal is supplied to the solenoid 51. After the actuator is operated by the action of the solenoid 51, the elements assume the position shown in FIGURE 2 at which time the piston head 12 is in the right-hand extreme position and the valve operating plunger 34 is in the left-hand extreme position.

Figure 3:
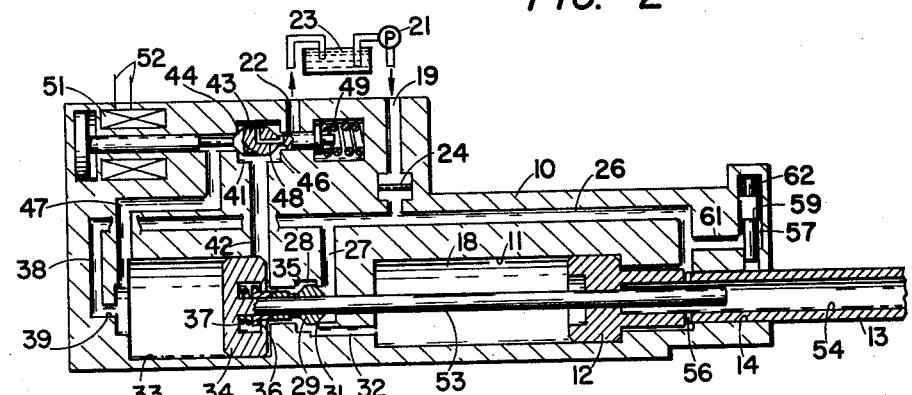
FIGURE 3 is a view similar to FIGURES 1 and 2 illustrating the positions the timed delay mechanism assumes after the electrical signal is shut off and immediately prior to the operation of the actuator.

As soon as the signal supplied to the solenoid 51 is shut off, the spring 49 operates to shift the pilot valve poppet 43 to the left to the position shown in FIGURE 3. This again isolates the left side of the valve operating plunger 34 from the reservoir return and connects the right side to the outlet port 22 so fluid under pressure flowing into the left end of the bore 33 through the orifice 39 operates to move the pilot valve plunger 34 to the right. The rate of movement is determined by the rate of flow through the orifice 39 and the cross sectional area of the bore 33 so the orifice 39 is sized in relationship to the area of the bore 33 and stroke the plunger to provide the desired timed delay. When the valve operating plunger 34 reaches the right-hand extreme position, it shifts the valve poppet 29 to the right. This action operates to connect the second chamber 18 to the outlet port 22 and initiates movement of the piston head 12 and piston rod 13 to the left. The elements are shown in FIGURE 3 after the timed delay of plunger movement when the valve operating plunger 34 reaches the right-hand extreme of its travel and movement of the piston 12 is initiated.

Those skilled in the art will recognize that a predetermined timed delay is provided between the moment when the solenoid 51 ceases to hold the pilot valve poppet 43 in the left-hand position and the moment when the valve poppet 29 is shifted to initiate leftward movement of the piston head 12. This period of the delay is a function of the size of the orifice 39 when compared to the volume of oil necessary to shift the valve operating plunger 34 from the left-hand position of FIGURE 2 to the right-hand position of FIGURE 3. Also, the solenoid 51 operates in response to an electrical signal to return the elements to a position for timing even when the signal is supplied during a timing cycle.

It should be understood that the illustrated embodiment is schematically shown to illustrate the concept of the invention and that normal seals and glands would be necessary in a physical embodiment. To simplify the understanding of the concept of this invention, such seals and glands have not been illustrated since they would be conventional in nature.

Although a preferred embodiment of this invention is illustrated, it will be realized that various modifications of the structural details may be made without departing from the mode of operation and the essence of the invention. Therefore, except insofar as they are claimed in the appended claims, structural details may be varied widely without modifying the mode of operation. Accordingly, the appended claims and not the aforesaid detailed description are determinative of the scope of the invention.

We claim:

1. In a device of the character described a power valve operable to control fluid under pressure, a plunger having first and second opposite sides movable in response to fluid under pressure acting on said sides between a first position and a second position, said plunger operating said power valve when it is in said second position, an extension on said plunger, a pressure source connected to said power valve and said extension, a reservoir return, a flow restriction connecting said source and said first side on said plunger, a pilot valve normally in a position connecting said second side to said reservoir return operable to connect both sides of said plunger together and to said return, the fluid under pressure acting on said extension moving said plunger to said first position when said said pilot valve connects both sides together, and the fluid under pressure connected through said flow restriction moving said plunger to said second position when said pilot valve is in its normal position.

2. An actuator comprising a body, a piston in said body movable under the influence of fluid under pressure, a valve operable to control fluid flow to said piston, a control member movable in response to fluid under pressure between a first position and a second position to which it operates said valve, fluid conducting means connected to said control member supplying fluid under pressure therethrough to produce movement thereof to said second position, a flow restriction in said conducting means controlling the rate of flow therethrough and the rate of movement of said control member from said first to said second positions, and an electrically operated pilot valve connected to said control member operable to initiate movement from said first position to said second position.

3. An actuator comprising a body, a piston movable on said body in response to fluid under pressure, valve means operable to control fluid under pressure supplied to said piston and produce movement thereof, a control member on said body movable from a first position to a second position in which it operates said valve, said member and body co-operating to define a first chamber the volume of which is increased by movement of said control member to said second position and a second chamber the volume of which is decreased by such movement, first fluid conducting means connected to supply fluid under pressure to said first chamber, and second fluid conducting means connected to drain fluid from said second chamber, only one of said fluid conducting means including a flow restriction determining the rate of flow therethrough thereby determining the rate of movement of said control member.

4. An actuator comprising a body, a piston movable on said body in response to fluid under pressure, valve means operable to control fluid under pressure supplied to said piston and produce movement thereof, a control member on said body movable from a first position to a second position in which it is connected to operate said valve, said member and body co-operating to define a first chamber the volume of which is increased by movement of said control member to said second position and a second chamber the volume of which is decreased by such movement, first fluid conducting means connected to supply fluid under pressure to said first chamber, second fluid conducting means connected to drain fluid from said second chamber, at least one of said fluid conducting means including a flow restriction determining the rate of flow therethrough thereby determining the rate of movement of said control member, and a pilot valve operable to connect said chamber together.

5. An actuator comprising a body, a piston and body movable under the influence of fluid under pressure, a power valve connected to said piston operable to control the flow of fluid under pressure thereto and produce said movement, a plunger having first and second opposite sides movable in response to fluid under pressure acting on said sides between a first position and a second position, said plunger operating said power valve when it is in said second position, an extension on said plunger, a pressure source connected to said power valve and said extension, a reservoir return, a flow restriction connecting said source and said first side on said plunger, a pilot valve operable from a position connecting said second side to said reservoir return to a second position connecting both sides of said plunger together and to said return, the fluid under pressure acting on said extension moving said plunger to its first position when said pilot valve connects both sides together, and the fluid under pressure connected through said flow restriction moving said plunger to its second position when said pilot valve is in its first position.

6. An actuator comprising a body, a piston and body movable under the influence of fluid under pressure, a power valve connected to said piston operable to control the flow of fluid under pressure thereto and produce said movement, a plunger having first and second opposite sides movable in response to fluid under pressure acting on said sides between a first position and a second position in which it operates said power valve, an extension on said plunger, a pressure source connected to said power valve and said extension, a reservoir return, a flow restriction connecting said source and said first side on said plunger, an electrically operated pilot valve normally in a position connecting said second side to said reservoir return operable to connect both sides of said plunger together and to said return, the fluid under pressure acting on said extension moving said plunger to said first position when said pilot valve connects both sides together, and the fluid under pressure connected through said flow restriction moving said plunger to said second position when said pilot valve is in its normal position.

References Cited in the file of this patent
UNITED STATES PATENTS

| 1,431,138 | Nichols | Oct. 3, 1922 |
| 2,423,920 | Yanchenko | July 15, 1947 |
| 2,437,991 | Baston | Mar. 16, 1948 |
| 2,451,010 | Yanchenko | Oct. 12, 1948 |
| 2,619,073 | Brooks et al. | Nov. 25, 1952 |
| 2,823,689 | Healy | Feb. 18, 1958 |